UNITED STATES PATENT OFFICE.

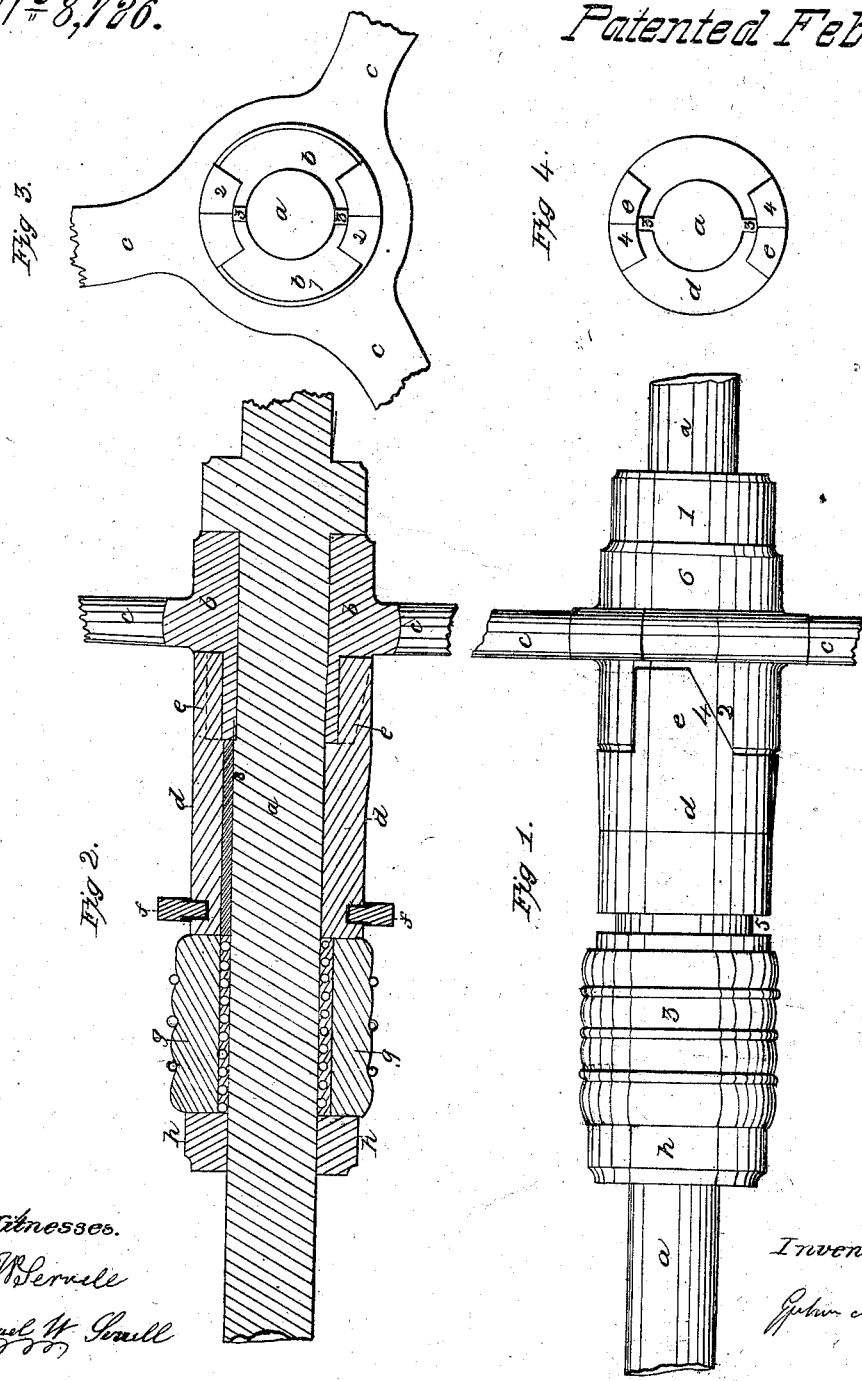

EPHRAIM MORRIS, OF NEW YORK, N. Y.

GOVERNOR.

Specification of Letters Patent No. 8,726, dated February 10, 1852.

*To all whom it may concern:*

Be it known that I, EPHRAIM MORRIS, of the city, county, and State of New York, machinist, have invented, made, and applied to use certain new and useful Improvements in Governors for Effecting a Regular Speed of Power Under Varying Resistances; and I do hereby declare that the following is a full, clear, and exact description of the construction, operation, and effects of the same, reference being had to the annexed drawing, making part of this my specification, wherein—

Figure 1, is a plan; Fig. 2, is a longitudinal section; Fig. 3, is an end view of the hub of the wheel through which power is taken, and Fig. 4, is an end view of the attachment to the shaft that communicates power.

The like marks of reference denote the same parts.

The object of my invention is to obtain motion by the difference of resistance offered to the operation of power, which motion is to be communicated to a throttle valve or other means so that when the resistance is great the power is increased, to keep up the speed, and when the resistance is small the operating force is shut off or decreased so that the motion is continuous at an equal speed or nearly so.

In the accompanying drawing *a*, is the shaft around which is a collar 1, securely fixed on or formed with the shaft against which is the hub *b*, which sets around the shaft *a*, so that it turns freely; *c*, are arms, connected to a rim to form a pulley or to a gear wheel or other means through which power applied to the shaft *a*, can be communicated to the desired object. The hub *b*, is formed with a recess or clutch, having one side straight, and the other side diagonally to the center of the shaft *a*, so as to form an incline 2,—*d*, is a cylinder surrounding the shaft *a*, and prevented from turning but allowed to slide lengthwise of the shaft *a*, by keys or feathers 3, this cylinder *d*, is formed with projections *e*, forming clutches, one edge of each of which is straight the other edge formed as an incline 4, matching the incline 2, 5, is a groove around the cylinder *d*, near one end taking a fork *f*, which is to connect to the throttle valve of a steam engine, the sluice of a water wheel, or other means which control the quantity of force operating to turn the shaft *a*, *g*, represents an india rubber or other spring surrounding the shaft *a*, between the end of the cylinder *d*, and a collar *h*, which may be formed as a nut or other means to give the necessary degree of pressure on the spring *g*, to force the clutch *e*, against the hub *b*.

The operation is as follows: Power being applied to rotate the shaft the motion is communicated to the hub *b*, by the clutch *e*, operating with its incline 4, against the incline 2, and if more power is required from the wheel connected to the arms *e*, the inclines 2, and 4, cause the cylinder *d*, to compress the india rubber spring *g*, the cylinder *d*, sliding on the shaft *a*, and its keys 3, gives a motion to the fork *f*, and any levers or parts connected to it; the proportions of which levers are to be such that as much as the cylinder *d*, moves in the compression of the spring so much more power shall be allowed to operate to rotate the shaft *a*, thereby keeping up a constant even motion of the shaft *a*, and hub *b*, and when the resistance is partially or entirely thrown off the spring *g*, expands until the compressing force of the inclines 2 and 4, is equal to the expansion of the spring *g*; moving the fork *f*, in the opposite direction shutting off the power in proportion to the motion of the cylinder *d*.

It will be seen that either or both collars 1 or *h*, may be made adjustable, so as to give the required pressure with the spring *g*, and also that other than india rubber springs may be used and that on large shafts, instead of having the springs surrounding the shaft, two or more separate springs may be placed between followers attached to the shaft *a*, and cylinder *d*.

If the shaft *a*, is required to rotate in either direction the inclines 2, and 4, may be made on both sides of the clutches, producing like effects, whichever way they are rotated; and the angles of the inclines with the center of the shaft must be regulated in proportion to the amount of motion required, and also the strength of the rotating spring. The position of the parts on the shaft may also be changed so as to have the cylinder *d*, a fixture, and the spring *g* on the other side of and against the hub.

In ordinary use, the spring must be so made and the parts so fitted that the inclines 2 and 4, can not be separated; but this governor may be applied in shafting where there is any sudden resistance or when the resistance is suddenly thrown off by having the inclines and springs so adjusted and formed that the inclines shall disengage and slide off each other till the power comes to its proper degree and speed so as to prevent breakage or damage to any machinery: And it will be seen that the power may be applied to the wheel on the hub *b*, to rotate the shaft, or on the shaft to rotate the hub; and a weighted lever with a roller may be used to keep the clutches together instead of a spring.

The cylinder *d*, may be guided by slide rods in a fixed cylinder as substitutes for the key 3, and the ends of the rods may be so set as to be acted on by the inclines 2.

What I claim as new and desire to secure by Letters Patent, is—

An incline or inclines between a hub and cylinder on a shaft in combination with a resisting spring or its equivalent whereby the motion of the parts due to the compression of the spring or its equivalent by the inclines produces motion to regulate the power in proportion to the resistance as described.

In witness whereof I have hereunto set my signature this twenty-sixth day of December one thousand eight hundred and fifty-one.

EPHM MORRIS.

Witnesses:
W. SERRELL,
LEMUEL W. SERRELL.